Patented Jan. 24, 1950

2,495,255

UNITED STATES PATENT OFFICE 2,495,255

POLYMERIC POLYAMINES

Harvey H. Hoehn, Hockessin, Del., assignor to E. I. du Pont de Nemours & Company, Wilmington, Del., a corporation of Delaware No Drawing. Application January 28, 1948, Serial No. 4,932

8 Claims. (Cl. 260—63)

This invention relates to polymeric polyamines and more particularly to new polymeric polyamines which are derived from monoolefin/carbon monoxide polymers and to methods for their preparation.

It is an object of this invention to provide new and useful polymeric polyamines and methods for their preparation. A further object is to provide new polymeric polyamines derived from monoolefin/carbon monoxide polymers. A still further object is to provide new poylmeric polyamines derived from ethylene/carbon monoxide polymers. Another object is to provide orientable linear polymeric polyamines derived from orientable ethylene/carbon monoxide polymers. Other objects will appear hereinafter.

The objects of this invention are accomplished by providing polymeric polyamines which are the reaction products of the reductive-amination of monoolefin/carbon monoxide polymers in which the mole ratio of monoolefin to carbon monoxide is from 150:1 to 1:1. The monoolefin/carbon monoxide polymers contain the carbonyl carbon in the chain of contiguous carbon atoms comprising the polymer chain. After the reductive-amination of the monoolefin/carbon monoxide polymer, the oxygen in some of the carbonyl groups is replaced by an amino nitrogen group. Thus the polymeric polyamines of this invention have a main carbon chain and amino-nitrogen groups as lateral substitutents with the nitrogen thereof directly attached to a carbon atom which is an integral part of said main carbon chain The polymeric polyamine may also contain carbonyl carbon in the chain of contiguous carbon atoms comprising the main carbon chain of said polyamine.

A new and unique class of polymeric polyamines now has been obtained by reduction in the presence of anhydrous ammonia, or primary or secondary amines, of monoolefin/carbon monoxide polymers in which the mole ratio of monoolefin to carbon monoxide is from 150:1 to 1:1, before the reduction. According to one embodiment, the reduction is effected by bringing into intimate contact, in the presence of a suitable hydrogenation catalyst at a temperature between 50° and 300° C. and a total pressure in excess of 20 atmospheres, the monoolefin/carbon monoxide polymer, hydrogen, and ammonia, or a primary or a secondary amine.

The polymeric polyamines of this invention can be obtained with widely varying physical properties. Thus polymeric polyamines of this invention in which the mole ratio of monoolefin to carbon monoxide is from 49:1 to 1:1 and which contain more than 1% primary amino nitrogen are soluble in 5% aqueous acetic acid while those containing less than 1% primary amino nitrogen are less readily soluble. Solutions of these polymeric polyamines in an organic solvent are useful for the preparation of films and also for the impregnation and treating of absorbent materials as textiles, paper and the like. Dispersions of these polymeric polyamines can also be made in non-solvents for the polymeric polyamines, such as water and organic materials. Polymeric polyamines prepared by reductive-amination of an orientable ethylene/carbon monoxide polymer low in carbon monoxide content, that is in which the mole ratio of ethylene to carbon monoxide is from 49:1 to 150:1, are orientable linear polymeric polyamines.

The monoolefin/carbon monoxide polymers reductively aminated to produce the polymeric polyamines of this invention are formed by polymerizing a monoolefin containing up to four carbon atoms, such as ethylene, propylene, isobutylene or a plurality of said monoolefins, with carbon monoxide in the presence of a polymerization catalyst, for example, a peroxy compound as disclosed and claimed in the copending application of M. M. Brubaker, U. S. Serial No. 552,374, filed September 1, 1944 now abandoned, of which Serial No. 97,908, filed June 8, 1949, is a continuation-in-part.

The following general description illustrates a preferred manner of preparing the polymeric polyamines of this invention. A pressure resistant reaction vessel is charged with the monoolefin/carbon monoxide polymer and a hydrogenation catalyst, and the vessel is then closed. Since oxygen generally has an oxidative effect on polyketones and polyamines, the reactor is normally evacuated after closure. Anhydrous ammonia is then bled into the vessel. The reactor is placed in a shaker machine, which can be heated, and is connected to a source of high pressure hydrogen. Hydrogen is expanded into the reactor after which heating and agitation are started. The reductive-amination may be conveniently carried out at temperatures from 50° to 300° C. and at a total pressure in excess of 20 atm., but preferably in the range of 40 to 1500 atm. Reaction is indicated by a pressure drop due to the utilization of ammonia and hydrogen. It is usually desirable to maintain the pressure within a selected range throughout the reaction by periodic addition of hydrogen. This is easily accomplished by the expansion of hydrogen from a high pressure storage. Cessation of hydrogen absorption indicates the end point of the reductive-amination. The reactor is then cooled, excess ammonia and hydrogen are bled off, the vessel is opened, and the contents discharged. The reaction product comprises a mixture of polyamine and catalyst. The catalyst may be removed from the reaction product by any of a number of procedures familiar to those skilled in the art. For example, the mixture may be taken up in a solvent such as toluene, the solution filtered and the filtrate subjected to distillation to remove the solvent. The polyamine remains as a nonvolatile residue.

The amount of ammonia or primary or secondary amine employed in the hydrogenation of the monoolefin/carbon monoxide polymers is at least one mole per carbonyl group in the polymer. In actual practice much larger amounts are employed, for example 2 to 12 moles per carbonyl group in the polymer. When a large amount of ammonia or primary or secondary amine is used it functions not only as a reactant but also as a reaction medium. If desired organic solvents can be used in conjunction with the ammonia or primary or secondary amine, for example, hydrocarbons such as benzene, xylene, cyclohexane, decahydronaphthalene, and the like, ethers, e. g., diethyl ether, dioxane, and the like, alcohols, e. g., isopropanol, and the like.

In the process of this invention there may be used any hydrogenation catalyst which is active for the reduction of oxo carbonyl groups. Thus, there may be used such hydrogenation catalysts as nickel, cobalt, platinum, ruthenium, palladium and the like. These catalysts may be in the massive form or in the form of fine powders, and they may be unsupported or supported on such carriers as pumice, kieselguhr, silica, and the like. Particularly useful are combinations of hydrogenating metals with dehydrating metal oxides, for example, combinations of nickel with alumina, thoria, and the like. In the preparation of these mixed catalysts, the hydrogenating metal and dehydrating metal oxide are either mixed prior to use or added separately to the reactor at the time of charging. The most useful mixtures are those in which the weight ratio of dehydrating oxide to hydrogenating metal is in the range of from 1:1 to 20:1. The preferred compositions are those in which the ratio of dehydrating metal oxide to hydrogenating metal lies between 10:1 and 2:1. Of the hydrogenating metals, nickel is preferred for use in the practice of this invention.

The amount of hydrogenation catalyst may be as low as 0.005% by weight of the monoolefin/carbon monoxide polymer. Generally, however, at least 1% of the catalyst is used. The amount which is most generally employed will range from 0.2 to 10% on the weight of the monoolefin/carbon monoxide polymer. The employment of amounts of catalyst above 20% is not economical and has no real practical advantage.

The reductive amination of the monoolefin/carbon monoxide polymers may be effected at temperatures of from 50° to 300° C. Generally, however, temperatures in the range of 150° to 250° C. are employed because under these conditions the formation of insoluble, crosslinked products is eliminated and good reaction rates are attained. This range, therefore embraces the preferred operating temperature conditions.

The total pressure of the system is adjusted with hydrogen to provide the required hydrogen concentration for reaction. Pressures in excess of 20 atmospheres are generally employed. The upper pressure is not critical and is determined solely by the limitations of the equipment employed. Usually, the reaction is carried out under a total pressure of from 60 to 1500 atmospheres because within this range, high conversions of carbonyl to amine groups and the best reaction rates are obtained.

In the following examples, all proportions are expressed in parts by weight, unless otherwise stated. These examples are submitted to illustrate preferred embodiments of the invention and are not to be construed as limitations thereof.

*Example I*

A silver-lined, steel reaction vessel is charged with 150 parts of dioxane, 50 parts of an ethylene/carbon monoxide polymer having an intrinsic viscosity of 0.048 and an ethylene/carbon monoxide mole ratio of 4.1:1, and 5 parts of an active nickel hydrogenation catalyst. The vessel is then closed, evacuated and charged with 25 parts of anhydrous ammonia. The reactor is placed in a shaker machine and connected to a source of high pressure hydrogen. Hydrogen is expanded into the reactor and heating and agitation are started. The temperature is raised to 120° C. and the pressure adjusted to 166.7 atm. These conditions are maintained for 5 hours during which time the observed pressure drop is 6.7 atm. The reactor is then allowed to cool, excess hydrogen and ammonia are bled off, and the mixture of solvent, polyamine, and catalyst is discharged. The reaction product is filtered to remove the catalyst and the filtrate is then subjected to distillation to remove the dioxane. Residual solvent is removed by purging the polyamine at room temperature under reduced pressure for 6 hours. There is thus obtained 48 parts of a viscous straw-colored resin. This product is partially soluble in 5% aqueous acetic acid and analyzes: 76.41% C, 11.48% H, 2.82% N, as determined by the Dumas procedure, and 1.02% N as determined by the Van Slyke amino nitrogen procedure. From these data it may be calculated that 17% of the carbonyl groups of the parent polymer are converted to amine groups and that 36% of the nitrogen present in the product is in the form of primary amine.

*Example II*

A silver-lined steel reaction vessel is charged with 50 parts of an ethylene/carbon monoxide polymer having an intrinsic viscosity of 0.139 and containing an ethylene/carbon monoxide mole ratio of 8.94:1, and 5 parts of an active nickel hydrogenation catalyst. The vessel is then closed, evacuated, and charged with 100 parts of anhydrous ammonia. The reactor is placed in a shaker machine and connected to a source of high pressure hydrogen. Hydrogen is expanded into the reactor until the pressure reaches 600 atm. The temperature is raised to 150° C. and the pressure adjusted to 950 atm. These conditions are maintained for 15 hours, during which the reactants are agitated. The observed pressure drop is 10 atm. The reactor is then allowed to cool, excess hydrogen and ammonia are bled off, and the mixture of polyamine and catalyst is discharged. The reaction product is dissolved in toluene and the solution filtered to remove the catalyst. The filtrate is then subjected to distillation to remove toluene. Residual toluene is removed by purging the polyamine for 2 hours at 90° C. under reduced pressure. There is thus obtained 38 parts of a light, straw-colored, clear, viscous resin which on cooling sets to a soft, tacky, wax-like material. This product has an intrinsic viscosity of 0.170 and analyzes 81.47% C, 13.67% H, 3.28% N, as determined by the Dumas procedure, and 3.22% N as determined by the Van Slyke amino nitrogen method. From these data it may be calculated that 73% of the carbonyl groups of the parent polymer are converted to amine groups and that 98% of the nitrogen present in the product is in the form of primary amine. The polyamine dissolves readily in 5% aqueous acetic acid to give clear, colorless, solutions.

Example III

A silver-lined, steel reaction vessel is charged with 50 parts of an ethylene/carbon monoxide polymer having an intrinsic viscosity of 0.08 and an ethylene/carbon monoxide mole ratio of 6.26:1, and 5 parts of an active nickel hydrogenation catalyst. The vessel is closed, evacuated, and charged with 100 parts of anhydrous ammonia. The reactor is then placed in a shaker machine, and connected to a source of high pressure hydrogen. Hydrogen is expanded into the vessel until the pressure reaches 600 atm. The reactants are then heated to 150° C. and agitated for 15 hours. A pressure range of 950–970 atm. is maintained during this period of reaction. Excess hydrogen and ammonia are bled off and the mixture of polyamine and catalyst is discharged. The reaction product is dissolved in toluene and the solution filtered to remove the catalyst. Removal of the toluene from the filtrate by distillation yields 36 parts of a light, straw-colored, tacky, soft resin as the nonvolatile residue. This product is soluble in 5% aqueous acetic acid, has an intrinsic viscosity of 0.123, and analyzes 80.49% C, 12.62% H, 4.38% N, as determined by the Dumas procedure, and 4.09% N as determined by the Van Slyke procedure. From these data it can be calculated that 68% of the carbonyl groups of the parent polymer are converted to amine groups, and 93% of the nitrogen present in the product is in the form of primary amine.

A 9" x 9" square of white sateen is impregnated by dipping it in a bath containing a solution prepared by pasting 1 part of the above polymer with 96 parts of distilled xylene, adding 3 parts of commercial methylene distearamide, and heating to 95° C. until the blend is clear. The impregnated sateen is squeezed by passing it through a wringer roll, adjusting the pressure so that the total pick-up of dispersion is 100% (wet weight of fabric—dry weight of fabric). The impregnated fabric is allowed to air dry and then heated for 10 minutes at 135° C. The treated fabric is found to have an initial water-repellency of 90, as determined by the method described in American Dyestuffs Reporter 30. 6–14 (1941), and to maintain a spray-rating of 50+ even after 6 launderings carried out as described below:

The fabric is washed for 40 minutes at a starting temperature of 212° F. in a mechanical launderer having a reversible cycle, using a washing solution containing 36 parts of soap, 18 parts of sodium carbonate, and 18,000 parts of water and maintaining a total load of 1000 parts. After each laundering the fabric is rinsed in distilled water and after the first, third, and sixth launderings, it is squeezed, allowed to air dry, and then heated for 10 minutes at 135° C., after which spray ratings are determined.

Example IV

A silver-lined, steel reaction vessel is charged with 50 parts of an ethylene/carbon monoxide polymer having an intrinsic viscosity of 0.10 and an ethylene/carbon monoxide mole ratio of 5.79:1, and 5 parts of an active nickel hydrogenation catalyst. The vessel is then closed, evacuated, and charged with 100 parts of anhydrous ammonia. The reactor is placed in a shaker machine and pressured with hydrogen to 600 atm. The temperature of the reactants is raised to 150° C. and the pressure adjusted to 975 atm. After 15 hours, the reactor is allowed to cool, excess hydrogen and ammonia are bled off, and the contents discharged. The reaction product is taken up in toluene, the solution filtered to remove the catalyst, and the filtrate is distilled to remove the toluene. There is thus obtained 39 parts of a straw-colored, soft, tacky, resin which is readily soluble in 5% aqueous acetic acid. This product has an intrinsic viscosity of 0.147 and analyzes 80.46% C, 13.18% H, 5.23% N, as determined by the Dumas procedure, and 4.13% N determined by the Van Slyke procedure. From these data it may be calculated that 87% of the carbonyl groups of the parent polymer are converted to amine groups, and that 79% of the nitrogen present in the product is in the form of primary amine.

Example V

A silver-lined, steel reaction vessel is charged with 50 parts of an ethylene/carbon monoxide polymer having an intrinsic viscosity of 0.111 and an ethylene/carbon monoxide mole ratio of 4.66:1, and 5 parts active nickel hydrogenation catalyst. The vessel is then closed, evacuated and charged with 100 parts of anhydrous ammonia. The reactor is placed in a shaker machine and connected to a source of high pressure hydrogen. Hydrogen is expanded into the vessel to a pressure of 600 atm. The reactants are subjected to agitation and heated to a temperature of 150° C. This temperature is maintained for 15 hours, adjusting the pressure to maintain a range of 810–970 atm. The observed pressure drop is 315 atm. The reactor is then allowed to cool, excess hydrogen and ammonia are bled off and the mixture of polyamine and catalyst is discharged. The reaction mixture is dissolved in toluene, filtered to remove the catalyst, and the filtrate is distilled to remove the toluene. There is obtained 30 parts of a light, straw-colored, soft, tacky resin. This product is soluble in 5% aqueous acetic acid, has an intrinsic viscosity of 0.123 and analyzes 79.64% C, 12.98% H, 6.20% N as determined by the Dumas procedure, and 3.90% N as determined by the Van Slyke procedure. From these data it may be calculated that 88% of the carbonyl groups of the parent polymer are converted to amine groups, and that 53% of the nitrogen present in the polyamine is in the form of primary amine.

Ten parts of the above polymeric polyamine were dissolved in 50 parts of benzene. Samples of porous paper were dipped in the solution, excess solution was removed, and the impregnated paper was allowed to dry overnight at ordinary room temperature. The treated papers were smooth in texture, waterproof, and the finish resisted washing with soap and water.

Example VI

A silver-lined, steel reaction vessel is charged with 50 parts of an ethylene/carbon monoxide polymer having an intrinsic viscosity of 0.10 and an ethylene/carbon monoxide mole ratio of 2.12:1, and 5 parts of an active nickel hydrogenation catalyst. The vessel is closed, evacuated, and charged with 100 parts of anhydrous ammonia. The reactor is placed in a shaker machine and connected to a source of high pressure hydrogen. Hydrogen is expanded into the reactor at a pressure of 600 atm. and heating and agitation are started. The temperature is raised to 150° C. and the pressure adjusted to 940 atm. These conditions are maintained for 15 hours, during which time the observed pressure drop is 20 atm. The reactor is then allowed to cool, excess hydrogen and ammonia are bled off, and the mixture of polyamine and catalyst is discharged. The reaction mixture is taken up in toluene, filtered to remove the nickel catalyst, and the filtrate is subjected to distillation to remove the toluene. There is obtained 22 parts of a brown, tacky, soft resin which is readily soluble in 5% aqueous acetic acid. This product has an intrinsic viscosity of 0.167 and analyzes 77.86% C, 10.56% H, 8.82% N, as determined by the Dumas procedure and 4.10% N as determined by the Van Slyke method. From these data it may be calculated that 85% of the carbonyl groups of the parent polymer are converted to amine groups, and that 46% of the nitrogen present in the product is in the form of primary amine.

Example VII

A silver-lined, steel reaction vessel is charged with 50 parts of an ethylene/carbon monoxide polymer having an intrinsic viscosity of 0.139 and an ethylene/carbon monoxide mole ratio of 1.76:1, and 5 parts of an active nickel hydrogenation catalyst. The vessel is then closed, evacuated and charged with 100 parts of anhydrous ammonia. The reactor is placed in a shaker machine and connected to a source of high pressure hydrogen. Hydrogen is expanded into the reactor at a pressure of 600 atm. and heating and agitation are started. The temperature is raised to 150° C. and the pressure is adjusted to 975 atm. These conditions are maintained for 15 hours, during which time the observed pressure drop is 55 atm. The reactor is allowed to cool, excess hydrogen and ammonia are bled off, and the mixture of catalyst and polyamine is discharged. The reaction mixture is taken up in toluene, the solution filtered to remove the nickel and the filtrate distilled to remove the toluene. There is obtained 28 parts of a dark brown, tacky, soft resin which is readily soluble in 5% aqueous acetic acid. This product has an intrinsic viscosity of 0.432 and analyzes 77.42% C, 10.28% H, 10.56% N, as determined by the Dumas procedure and 2.77% N as determined by the Van Slyke procedure. From these data it may be calculated that 92% of the carbonyl groups of the parent polymer are converted to amine groups and 26% of the nitrogen present in the product is in the form of primary amine.

Example VIII

A silver-lined, steel reaction vessel is charged with 50 parts of an ethylene/carbon monoxide polymer having an intrinsic viscosity of 0.10 and an ethylene/carbon monoxide mole ratio of 5.79:1, and 5 parts of an active nickel hydrogenation catalyst. The vessel is closed, evacuated, and charged with 100 parts of anhydrous methylamine. The reactor is placed in a shaker machine and connected to a source of high pressure hydrogen. Hydrogen is expanded into the reactor to a pressure of 600 atm. and heating and agitation are started. The temperature is raised to 150° C. and the pressure adjusted to 950 atm. These conditions are maintained for 15 hours, during which time the observed pressure drop is 35 atm. The reactor is allowed to cool, excess hydrogen is bled off, and the mixture of polyamine, catalyst, and residual methylamine is discharged. The reaction product is taken up in toluene, the solution is filtered to remove the nickel catalyst, and the filtrate is distilled to remove the toluene. There is thus obtained 38 parts of a soft, tacky, light straw-colored resin which is readily soluble in 5% aqueous acetic acid. This product has an intrinsic viscosity of 0.178 and analyzes 80.88% C, 12.09% H, and 4.51% N, as determined by the Dumas procedure. From these data it may be calculated that 82% of the carbonyl groups of the parent polymer are converted to amine groups.

Example IX

A silver-lined, steel reaction vessel is charged with 50 parts of an ethylene/carbon monoxide polymer having an intrinsic viscosity of 0.206 and an ethylene/carbon monoxide mole ratio of 5.38:1, and 5 parts of a ruthenium-on-alumina catalyst containing 5% ruthenium by weight. The vessel is then closed, evacuated, and charged with 100 parts of anhydrous ammonia. The reactor is placed in a shaking machine and connected to a source of high pressure hydrogen. Hydrogen is expanded into the reactor until the pressure reaches 500 atm. The temperature is raised to 200° C. and the pressure adjusted to 915 atm. These conditions are maintained for 15 hours, during which time the reactants are agitated. A pressure drop of ca. 60 atm. is observed. The reactor is then allowed to cool, excess hydrogen and ammonia are bled off, and the mixture of polyamine and catalyst is discharged. The reaction product is dissolved in toluene and the solution filtered to remove the catalyst. The filtrate is then subjected to distillation to remove toluene. Residual toluene is removed by purging the polyamine with nitrogen at 100° C. under reduced pressure for 1 hour. There is thus obtained 30 parts of a colorless, tacky, wax-like resin which is soluble in 5% aqueous acetic acid. This product has an intrinsic viscosity of 0.23 and analyzes 78.98% C, 13.35% H, 5.02% N, as determined by the Dumas procedure, and 2.98% N determined by the Van Slyke amino nitrogen procedure. From these data it may be calculated that 64% of the carbonyl groups in the parent polymer are converted to amine groups and that 59% of the nitrogen present in the product is in the form of primary amine. The polyamine dissolves readily in 5% aqueous acetic acid to give clear, colorless solutions which are quite stable and color only slightly on standing in the presence of air.

Example X

A silver-lined, steel reaction vessel is charged with 50 parts of an ethylene/carbon monoxide polymer having an intrinsic viscosity of 0.113 and an ethylene/carbon monoxide mole ratio of 11.3:1, and 5 parts of a ruthenium-on-alumina catalyst containing 5% ruthenium by weight. The vessel is then closed, evacuated, and charged with 100 parts of anhydrous ammonia. The reactor is placed in a shaking machine and connected to a source of high pressure hydrogen. Hydrogen is expanded into the reactor until the pressure reaches 450 atm. The temperature is raised to 250° C. and the pressure adjusted to 985 atm. These conditions are maintained for 15 hours, during which time the reactants are agitated and the observed pressure drop is 20 atm. The reactor is then allowed to cool, excess hydrogen and ammonia are bled off, and the mixture of polyamine and catalyst is discharged. The reaction product is dissolved in toluene and the solution filtered to remove the catalyst. The filtrate is then subjected to distillation to remove the toluene. Residual toluene is removed by purging with nitrogen at 130° C. under reduced pressure for 1 hour. There is thus obtained 37 parts of a hard, non-tacky, colorless wax. This product is soluble in 5% aqueous acetic acid, has an intrinsic viscosity of 0.44 and analyzes 82.49% C, 13.90% H, 2.85% N, as determined by the Dumas procedure, and 1.92% N as determined by the Van Slyke amino nitrogen procedure. From these data it may be calculated that 70% of the carbonyl groups are converted to amino groups and that 67% of the N present in the product is in the form of primary amine. The polyamine solutions in 5% aqueous acetic acid are stable and color only slightly on standing in the presence of air.

Example XI

Fifty parts of an ethylene/carbon monoxide polymer having an intrinsic viscosity of 0.11 and an ethylene/carbon monoxide mole ratio of 30:1, and 10 parts of an active nickel hydrogenation catalyst are charged into a silver-lined steel pressure reactor. The reactor is closed, evacuated and then charged with 10 parts of anhydrous ammonia. The reaction mixture is heated to 200° C. and then pressured with hydrogen to 200 atm. After 5 hours at the indicated pressure and temperature conditions, the reactor is allowed to cool, opened, the contents discharged, the reaction product dissolved in toluene, and filtered to remove catalyst. After removal of the toluene by distillation there is obtained a soft, colorless, grease-like product which is soluble in 5% aqueous acetic acid. The product has an intrinsic viscosity of 0.14 and analyzes 84.36% C, 14.32% H, 1.39% total nitrogen (Dumas method), and 1.11% primary amino nitrogen (Van Slyke method).

Example XII

Twenty-five parts of an ethylene/carbon monoxide polymer having an intrinsic viscosity of 1.09 and an ethylene/carbon monoxide mole ratio of 113:1, and 3 parts of an active nickel hydrogenation catalyst are charged into a pressure reactor. The vessel is closed, evacuated, and then charged with 75 parts of anhydrous ammonia. Hydrogen is expanded into the reactor so that at 300° C. the pressure is 1000 atm. These conditions of temperature and pressure are maintained for 15 hours. Thereafter the reactor is permitted to cool, opened and the product discharged. From the reaction mixture there is isolated a colorless, hard solid having an intrinsic viscosity of 0.58, which is orientable and which analyzes 84.76% C, 14.29% H, and 0.39% N (Kjeldahl method). The product is soluble in hot toluene but only slightly soluble in hot 5% aqueous acetic acid. Hot-pressed and solvent cast films of the polymeric polyamine accept acid dyes readily.

Example XIII

Fifty parts of an isobutylene/ethylene/carbon monoxide polymer of intrinsic viscosity 0.16, 5 parts of a ruthenium oxide-on-alumina catalyst and 100 parts of anhydrous ammonia are charged into a pressure reactor and the mixture subjected to hydrogenation at 250° C., for 5 hours under a hydrogen pressure of 950 atmospheres. From the reaction mixture there is isolated a colorless, clear, tacky product which analyzes 78.69% C, 12.78% H, and 2.94% primary amino nitrogen (Van Slyke method).

The above experiment is duplicated, except that a propylene/ethylene/carbon monoxide polymer of intrinsic viscosity 0.24 is used in place of the isobutylene/ethylene/carbon monoxide polymer. The product obtained is a colorless, clear, tacky resin analyzing 78.81% C, 13.01% H, 6.42% total N, and 3.13% primary amino nitrogen (Van Slyke).

Example XIV

Fifty parts of an ethylene/carbon monoxide polymer having an ethylene/carbon monoxide mole ration of 5:1 and an intrinsic viscosity corresponding to a molecular weight of 600, 10 parts of activated alumina and 3 parts of an active nickel catalyst are charged into a pressure reactor together with 100 parts of ammonia. The reaction mixture is heated at 200° C. for 5 hours under a hydrogen pressure of 950 atm. The product obtained is a viscous, practically colorless oil which shows practically no tendency to discolor on standing in air for several weeks. The product analyzes 79.57% C, 13.44% H, 3.29% total N (Dumas method), 2.17% primary amino nitrogen (Van Slyke method) and has an intrinsic viscosity of 0.06.

Example XV

One hundred parts of an ethylene/carbon monoxide polymer having an ethylene/carbon monoxide mole ratio of 3.6:1 and an intrinsic viscosity corresponding to a molecular weight of 600, 10 parts of an active nickel catalyst, 75 parts of ammonia, and 156 parts of cyclohexane are charged into a pressure reactor and the mixture heated for 1 hour at 250° C. under a hydrogen pressure of 250 atm. The heating and agitation are continued for 5 hours longer. Thereafter the reactor is opened, the contents discharged and the product isolated. From the reaction mixture there is obtained a soft, tacky, grease-like product which is soluble in 5% aqueous acetic acid and analyzes 80.87% C, 12.95% H, 5.24% total N (Dumas method), and 3.89% primary amino nitrogen (Van Slyke method). The intrinsic viscosity of the product is 0.10.

Example XVI

Twenty parts of an ethylene/carbon monoxide polymer having an intrinsic viscosity of 0.16 and an ethylene/carbon monoxide mole ratio of 11.3:1, 3 parts of an active nickel-on-kieselguhr catalyst, 20 parts of ammonia and 90 parts of decahydronaphthalene are charged into a pressure reactor and the mixture heated at 200° C. for 3 hours under a hydrogen pressure of 160 atmospheres. From the reaction mixture there is isolated a soft, pale-straw colored, grease-like resin having an intrinsic viscosity of 0.10 and analyzing 82.36% C, 13.70% H, and 2.90% primary amino nitrogen (Van Slyke method). The product is soluble in 5% aqueous acetic acid.

Example XVII

Fifty parts of an ethylene/carbon monoxide polymer having an intrinsic viscosity corresponding to a molecular weight of 600 and an ethylene/carbon monoxide mole ratio of 6:1, 5 parts of an active nickel-on-kieselguhr catalyst, 25 parts of ammonia, and 79 parts of isopropyl alcohol are charged into a pressure reactor and the charge heated to 200° C. for 5 hours under 200 atm. hydrogen pressure. The product obtained is a straw-colored, viscous oil which is readily soluble in 5% aqueous acetic acid and anlyzes 80.73% C, 13.26% H, 4.96% total nitrogen (Dumas method) and 4.54% primary amino nitrogen (Van Slyke method).

Example XVIII

A pressure reactor is charged with 50 parts of an ethylene/carbon monoxide polymer having an intrinsic viscosity of 0.24 and an ethylene/carbon monoxide mole ratio of 3.5:1, 5 parts of an active nickel-on-kieselguhr catalyst, and 100 parts of ammonia. The reactor is then heated to 175° C. and pressured with hydrogen to 835 atm. These conditions are maintained for 5 hours. Thereafter the reactor is allowed to cool, the contents discharged and the product isolated from the reaction mixture. There is thus obtained 36 parts of a soft, straw-colored resin which is soluble in 5% aqueous acetic acid. The intrinsic viscosity of the product is 0.25 and it analyzes 78.71% C, 12.89% H, 7.64% total nitrogen (Dumas method), and 5.04% primary amino nitrogen (Van Slyke method).

A suspension of 200 parts of a blue copper phthalocyanine pigment dyestuff in a solution of 100 parts of the above polymeric polyamine in 10 parts of 5% aqueous acetic acid is prepared and the suspension employed in making strike outs on cotton broadcloth and on porous paper. After drying for 24 hours the pigment dyestuff appears firmly bound on the cloth and paper. The treated paper and broadcloth are resistant to washing with soap and water.

Example XIX

Example XVIII is duplicated except that an ethylene/carbon monoxide polymer having an intrinsic viscosity of 0.10 and an ethylene/carbon monoxide mole ratio of 5.79:1 is used. The polymeric polyamine obtained has an intrinsic viscosity of 0.143, is soluble in 5% aqueous acetic acid and analyzes 80.33% C, 13.13% H, 4.88% total nitrogen (Dumas method) and 4.06% primary amino nitrogen (Van Slyke method).

Example XX

A pressure reactor is charged with 50 parts of an ethylene/carbon monoxide polymer having a molecular weight corresponding to 1200 and an ethylene/carbon monoxide mole ratio of 3.6:1, and 5 parts of an active nickel catalyst. The vessel is closed, evacuated, cooled, and 100 parts of dimethylamine distilled into the reactor. The reactor is placed in a shaker machine and connected to a source of high pressure hydrogen. Hydrogen is expanded into the reactor, and heating and agitation are started. The temperature is raised to 200° C. and the pressure adjusted to 900 atmospheres with hydrogen, where it is maintained for 15 hours. Thereafter the reactor is allowed to cool, the product diluted with toluene, and discharged from the reactor. The reaction mixture is filtered to remove the catalyst, and the filtrate is concentrated by distillation under reduced pressure. The product obtained is a straw-colored, tacky grease, which is soluble in 5% aqueous acetic acid. Analysis of the product shows it to contain 78.03% C, 12.82% H, and 5.88% N by the Dumas method, and an intrinsic viscosity of 0.13. The C/N ratio is 28/1 and the neutral equivalent 276.

The intrinsic viscosities and molecular weights referred to in the examples may be determined by calculation from measurements on 0.125% solutions in xylene at 85° C. in accordance with the method of Staudinger, Zeits. Phys. Chem. 171, (1929) or ebullioscopically.

A typical preparation of an ethylene/carbon monoxide polymer employable in the practice of this invention is the following: A pressure reactor is swept free of air with deoxygenated nitrogen, charged with 3 parts of di(tertiary butyl) peroxide and 100 parts of cyclohexane, closed, and evacuated. The reactor is then placed in a heated shaker box, and connected to a high pressure source of mixed gas containing 88% ethylene and 12% carbon monoxide. Ethylene/carbon monoxide mixed gas is expanded into the reactor to a pressure of 40 atmospheres and heating and agitation are started. The temperature of the reaction mixture is raised to 135° C. and maintained at 130° to 140° C. for 15 hours, during which time the pressure is adjusted to 133.3 atmospheres by repressuring with ethylene/carbon monoxide mixed gas. The vessel is then closed, excess ethylene and carbon monoxide are bled off, and the vessel is opened. The reaction product comprises a mixture of ethylene/carbon monoxide polyketone and cyclohexane. The removal of the cyclohexane by distillation leaves the ethylene/carbon monoxide polyketone as a nonvolatile residue. Sixty parts of a white, tacky beeswax-like product melting at 60° to 95° C. and containing ethylene and carbon monoxide in a mole ratio of 5:1 is obtained.

Examples of other organic compounds which can be polymerized with the monoolefin and carbon monoxide are vinyl chloride, vinyl acetate styrene and other vinyl compounds, methyl methacrylate and other vinylidene compounds dimethyl maleate, maleic anhydride and other vinylene compounds and the like.

The following example illustrates the preparation of an active nickel catalyst useful in the hydrogenation of ethylene/carbon monoxide polymers, in the presence of ammonia or primary or secondary amines, in accordance with the process described herein: Three hundred parts of a finely divided alloy composed of equal parts of nickel and aluminum is added with stirring, over a period of 1.5 hours, to a solution of 342 parts of sodium hydroxide in 1590 parts of distilled water maintained at 50° C. The supernatant liquid is then decanted and the catalyst washed with distilled water until it is free from alkali.

The nickel catalysts made by the alkali extraction of the alkali-soluble component of an alloy of nickel with an alkali soluble metal have given especially good results. The preparation of such catalysts is described in U. S. Patent 1,628,190. Other methods for preparing these catalysts include the reduction of nickel salts with sodium naphthalene, as described in U. S Patent 2,177,412. These catalysts may be in the pyrophoric form or they may be stabilized by exposure to an oxidizing atmosphere under conditions such that the temperature of the catalyst mass does not rise above 50° C. Supported nickel catalysts may be prepared by adding the supporting material during the catalyst preparation or the support may be formed during the catalyst preparation.

In the examples, ammonia, methylamine and dimethylamine have been used as the aminating agents. It is to be understood, however, that any compound selected from the group consisting of ammonia, primary amines and secondary amines can be used. Examples of other primary and secondary amines are ethylamine, pentylamine decylamine, dodecylamine, octadecylamine, di butylamine, diamylamine, didodecylamine, and the like. In place of these alkylamines there can be used cycloaliphatic and aromatic primary and secondary amines. Examples are cyclohexylamine, dicyclohexylamine, aniline, diphenylamine and the like.

Alternately the reduction to primary polyamines may be accomplished chemically by treating the monoolefin/carbon monoxide polymer with formamide or formamide-forming reactants (i. e., $(NH_4)_2CO_3+HCOOH$), in accordance with the general procedure described by Leuckart, Ber. 18, 2341 (1885).

Although in the examples submitted to illustrate the best modes for practicing this invention certain definite conditions of temperature, pressure, concentration, duration of reaction, catalyst, etc., are indicated, it is to be understood that these are interdependent variables and that variation in one necessitates compensating adjustments in the others.

In addition to the uses for the polymeric polyamines which have been disclosed these products are useful as leather treating agents to improve dye receptivity, as additives for bentonite drilling muds, as peptizing agents for rubber, and the like. The 5% aqueous acetic acid soluble polymeric polyamines are useful as deflocculating agents for water-repellent waxes, as water repellent finishes for paper and fabric, as wool-treating agents to reduce shrinkage and the like. The soluble and the insoluble polymeric polyamines are useful for films and fibers, and the like. They also are useful for fixing acid dyestuffs in fibers, paper, and fabrics to make the color water-fast, as antistatic agents for polyethylenes, as anti-fogging agents for glass, as intermediates for oil-soluble dyestuffs useful in coloring polyethylene films and fibers, as dispersants for metallic enamels, etc.

As many apparently widely different embodiments of this invention may be made without departing from the spirit and scope thereof it is to be understood that this invention is not limited to the specific embodiments thereof except as defined in the appended claims.

I claim:

1. A polymeric polyamine which is the reaction product of the reductive-amination of a polymer of a monoolefin containing from 2 to 4 carbon atoms with carbon monoxide in which the mole ratio of monoolefin to carbon monoxide is from 150:1 to 1:1, said polymeric polyamine having a main carbon chain and amino-nitrogens attached solely to members of the class consisting of hydrogen and hydrocarbon as lateral substituent groups with the nitrogen thereof directly attached to a carbon atom which is an integral part of said main carbon chain.

2. A polymeric polyamine soluble in 5% aqueous acetic acid which is the reaction product of the reductive-amination of a polymer of a monoolefin containing from 2 to 4 carbon atoms with carbon monoxide in which the mole ratio of monoolefin to carbon monoxide is from 49:1 to 1:1, said polymeric polyamine having a main carbon chain and amino-nitrogens attached solely to members of the class consisting of hydrogen and hydrocarbon as lateral substituent groups with the nitrogen thereof directly attached to a carbon atom which is an integral part of said main carbon chain and having at least 1% primary amino-nitrogen based on the total weight of said polymeric polyamine.

3. A polymeric polyamine which is the reaction product of the reductive-amination of a polymer of a monoolefin containing from 2 to 4 carbon atoms with carbon monoxide in which the mole ratio of monoolefin to carbon monoxide is from 150:1 to 1:1, said polymeric polyamine having a main carbon chain containing carbonyl carbon in the chain of contiguous carbon atoms comprising said main carbon chain and amino-nitrogens attached solely to members of the class consisting of hydrogen and hydrocarbon as lateral substituent groups with the nitrogen thereof directly attached to a carbon atom which is an integral part of said main carbon chain.

4. A polymeric polyamine which is the reaction product of the reductive-amination of a polymer of ethylene with carbon monoxide in which the mole ratio of ethylene to carbon monoxide is from 150:1 to 1:1, said polymeric polyamine having a main carbon chain and amino-nitrogens attached solely to members of the class consisting of hydrogen and hydrocarbon as lateral substituent groups with the nitrogen thereof directly attached to a carbon atom which is an integral part of said main carbon chain.

5. A polymeric polyamine soluble in 5% aqueous acetic acid which is the reaction product of the reductive-amination of a polymer of ethylene with carbon monoxide in which the mole ratio of ethylene to carbon monoxide is from 49:1 to 1:1, said polymeric polyamine having a main carbon chain and amino-nitrogens attached solely to members of the class consisting of hydrogen and hydrocarbon as lateral substituent groups with the nitrogen thereof directly attached to a carbon atom which is an integral part of said main carbon chain and having at least 1% primary amino-nitrogen based on the total weight of said polymeric polyamine.

6. A polymeric polyamine which is the reaction product of the reductive-amination of a polymer of ethylene with carbon monoxide in which the mole ratio of ethylene to carbon monoxide is from 150:1 to 1:1, said polymeric polyamine having a main carbon chain containing carbonyl carbon in the chain of contiguous carbon atoms comprising said main carbon chain and amino-nitrogens attached solely to members of the class consisting of hydrogen and hydrocarbon as lateral substituent groups with the nitrogen thereof directly attached to a carbon atom which is an integral part of said main carbon chain.

7. An orientable linear polymeric polyamine which is the reaction product of the reductive-amination of an orientable polymer of ethylene with carbon monoxide in which the mole ratio of ethylene to carbon monoxide is from 150:1 to 49:1, said polymeric polyamine having a main carbon chain and amino-nitrogens attached solely to members of the class consisting of hydrogen and hydrocarbon as lateral substituent groups with the nitrogen thereof directly attached to a carbon atom which is an integral part of said main carbon chain.

8. A solution of a polymeric polyamine as defined in claim 1 in an organic solvent therefor.

HARVEY H. HOEHN.

No references cited.